United States Patent [19]
Bonnet

[11] Patent Number: 5,839,566
[45] Date of Patent: Nov. 24, 1998

[54] BELT-CARRIED TILT TRAY SORTER

[75] Inventor: Henri Bonnet, Atlanta, Ga.

[73] Assignee: United Parcel Service of America, Inc., Atlanta, Ga.

[21] Appl. No.: 705,617

[22] Filed: Aug. 30, 1996

[51] Int. Cl.$^6$ .................................................. B65G 47/38
[52] U.S. Cl. ........................................................ 198/370.04
[58] Field of Search ........................................ 198/370.04

[56] References Cited

U.S. PATENT DOCUMENTS

| | | | |
|---|---|---|---|
| 3,360,106 | 12/1967 | Harrison et al. | 198/370.04 |
| 3,386,563 | 6/1968 | Harrison | 198/370.04 |
| 4,089,404 | 5/1978 | Venzke . | |
| 4,722,430 | 2/1988 | Canziani . | |
| 4,744,454 | 5/1988 | Pölling . | |
| 4,846,335 | 7/1989 | Hartlepp . | |
| 4,856,642 | 8/1989 | Nicholson et al. . | |
| 5,018,928 | 5/1991 | Hartlepp | 414/339 |
| 5,054,601 | 10/1991 | Sjogren et al. . | |
| 5,086,905 | 2/1992 | Pölling . | |
| 5,307,921 | 5/1994 | Richardson . | |
| 5,327,171 | 7/1994 | Smith et al. . | |
| 5,335,767 | 8/1994 | Killer et al. | 198/365 |
| 5,388,681 | 2/1995 | Bonnet . | |
| 5,430,282 | 7/1995 | Smith et al. . | |
| 5,433,311 | 7/1995 | Bonnet . | |
| 5,489,017 | 2/1996 | Bonnet . | |
| 5,510,603 | 4/1996 | Hess et al. . | |

FOREIGN PATENT DOCUMENTS

| | | |
|---|---|---|
| 0 540 464 A2 | 5/1993 | European Pat. Off. . |
| 44 13 967 A1 | 11/1994 | Germany . |
| 836518 | 6/1960 | United Kingdom . |

*Primary Examiner*—William E. Terrell
*Assistant Examiner*—Mark Deuble
*Attorney, Agent, or Firm*—Jones & Askew, LLP

[57] ABSTRACT

A tilt tray sorting system with a high speed, reliable, mechanical actuator for tilting the trays, suitable for tilting trays carried on a belt conveyor. A plurality of tilt tray assemblies include an actuator, mounted for movement with a tilt tray and for movement relative to the tray. The actuator includes a trigger arm extending below the tray, preferably through an opening in a belt that carries the tray. A trip mechanism is selectively positioned in the path of the trigger arm to move the actuator and tilt the tray.

17 Claims, 6 Drawing Sheets

Fig. 1

Fig_2

Fig_7

Fig_8

*Fig_9*

*Fig_10*

*Fig_11*

BELT-CARRIED TILT TRAY SORTER

TECHNICAL FIELD

The present invention relates to an actuator for tilting trays to discharge their contents, and more particularly relates to a tilt tray sorting system including mechanical actuators for tilting trays moving along a belt or a track. The invention is particularly advantageous in sorting systems in which trays are carried on an endless conveyor belt.

BACKGROUND OF RELATED ART

Package delivery companies pick up millions of packages daily from thousands of locations over a large geographical area and transport them, primarily by truck and airplane, to a correspondingly large number of scattered destinations. To meet a rigorous schedule and provide accurate deliveries, a package delivery company must use automated transfer systems to match packages arriving at its sorting hubs with proper outgoing transport headed for the packages' destinations. Because deliveries are time sensitive, the sorting equipment must be very fast, yet provide gentle handling of packages.

For these reasons, automatic package sorting systems are rapidly replacing manual sorting stations in package delivery company facilities. Various types of sorting systems have been developed for different needs. Examples are the rotary package sorter shown in U.S. Pat. Nos. 5,284,252 and 5,441,141 to Bonnet, the rail-carried tilt tray sorter shown in U.S. Pat. No. 5,433,311 to Bonnet, and the conveyor belt diverters shown in U.S. Pat. Nos. 4,798,275 to Leemkuil et. al. (roller) and 4,711,357 to Langenbeck et. al. (diverter arm).

The coveyor belt-carried pneumatic tilt tray sorter of U.S. Pat. No. 5,388,681 to Bonnet provides an efficient sorter that has many less moving parts than a typical rail-mounted tilt tray sorter. However, pneumatic systems are subject to well-known maintenance problems, particularly in humid climates. Also, the tilting speed is limited by the time required to inflate a lifting chamber under the tilting tray.

SUMMARY OF THE INVENTION

The present invention seeks to provide an improved tilt tray sorting system with a high speed, reliable, mechanical actuator for tilting the trays, suitable for tilting trays carried on a belt conveyor.

In accordance with the invention, this object is accomplished by providing tilting tray assemblies including an actuator, mounted for movement with a tilt tray and for movement relative to the tray, comprising a tray-engaging portion and a trigger arm extending below the tray. A trip mechanism is selectively positioned in the path of the trigger arm to move the actuator and tilt the tray.

Generally described, the present invention provides a tilt tray sorting system, comprising a plurality of tilt tray assemblies mounted for movement along a predefined path of travel, each of the assemblies comprising a tray mounted for tilting about an axis generally parallel to the path of travel, and an actuator, mounted for movement with the tray and movement relative to the tray, comprising a tray-engaging portion and a trigger arm extending below the tray; and a moveable trip member selectively positionable in the path of the trigger arm, such that when the trip member strikes the trigger arm, the actuator moves to tilt the tray about the axis. In a preferred embodiment, the actuator pivots about a point between the tray-engaging portion and the trigger arm; and when the trip member strikes the trigger arm, the actuator pivots about the pivot point and the tray-engaging portion tilts the tray about the axis.

Preferably, a conveyor belt carries the tray assemblies along the path of travel; and each of the trays defines a left tilt axis along which the tray engages the belt on one side of a centerline of the belt, and a right tilt axis along which the tray engages the belt on the other side of the centerline of the belt. In this embodiment, each of the tray assemblies has a pair of the actuators, one for tilting the tray about each of the respective tilt axes. A controller may be provided to automatically position the trip member in the path of either of the trigger arms of the pair of actuators, such that the tray may be tilted toward either side of the belt. Multiple output locations may be provided, each with its own trip mechanism.

In the preferred embodiment, a resilient link connects the tray to the belt so as to return the tray to a level position on the belt after the tray is tilted by one of the actuators, which preferably comprise L-shaped members each including a lifting arm lying between the belt and the tray, with the trigger arm extending from the lifting arm at the actuator pivot point through an opening in the belt. The trip member is located under the belt, so as to selectively strike the trigger arm and cause the actuator to pivot about the opening in the belt, such that the lifting arm rotates upwardly away from the belt and lifts one side of the tray, causing the tray to pivot about the opposite tilt axis. The trip member preferably comprises one of two rollers mounted on the branches of a Y-shaped trip mechanism, one of the rollers being positioned in the path of a trigger arm when the trip mechanism is operated.

In a further preferred embodiment, the invention provides a tilt tray sorting system, comprising a conveyor belt; at least one tray spanning a centerline of the belt, the tray defining at least one left foot defining a left tilt axis, and at least one right foot defining a right tilt axis spaced across the centerline from the left tilt axis, the feet elevating a central portion of the tray above the belt; an L-shaped left actuator comprising a left lifting arm lying between the belt and the tray adjacent to the left foot, and joined to a left trigger arm extending down through a left opening in the belt; an L-shaped right actuator comprising a right lifting arm lying between the belt and the tray adjacent to the right foot, and joined to a right trigger arm extending down through a right opening in the belt; a link attached to the tray approximately along the centerline of the belt, and extending down through a retractor opening in the belt; a spring retained between a lower end of the link and the belt, the spring operative to urge the tray into a position wherein both the left and right feet are engaging the belt; and means for selectively moving a trip member into the path of the left trigger arm or the right trigger arm. The trip member comprises a Y-shaped trip arm pivotally mounted about a pivot point generally parallel to and beneath the centerline of the belt, each branch of the Y carrying a roller; and the means for selectively moving the trip member comprises a three-position solenoid operative to swing the trip arm to move one of the rollers into the path of the left trigger arm, or alternatively to move the other of the rollers into the path of the right trigger arm. The belt comprises an endless belt passing around a pair of end drums each including annular channels therein for allowing unobstructed passage of the trigger arms and the link around the drums.

According to another aspect of the invention, a tilt tray sorting system is provided, comprising a plurality of tilt tray assemblies mounted on a belt conveyor, each of the assemblies comprising a tray mounted for tilting about an axis generally parallel to a path of travel of the belt and an actuator, comprising a tray-engaging portion and a trigger arm extending through an opening in the belt to a position below the belt; and a moveable trip member selectively positionable in the path of the trigger arm, such that when the trip member strikes the trigger arm, the actuator moves to tilt the tray about the axis.

Other objects, features, and advantages of the present invention will become apparent upon review of the following detailed description of preferred embodiments thereof, when taken in conjunction with the appended drawings.

DETAILED DESCRIPTION OF THE INVENTION

Figure 1:
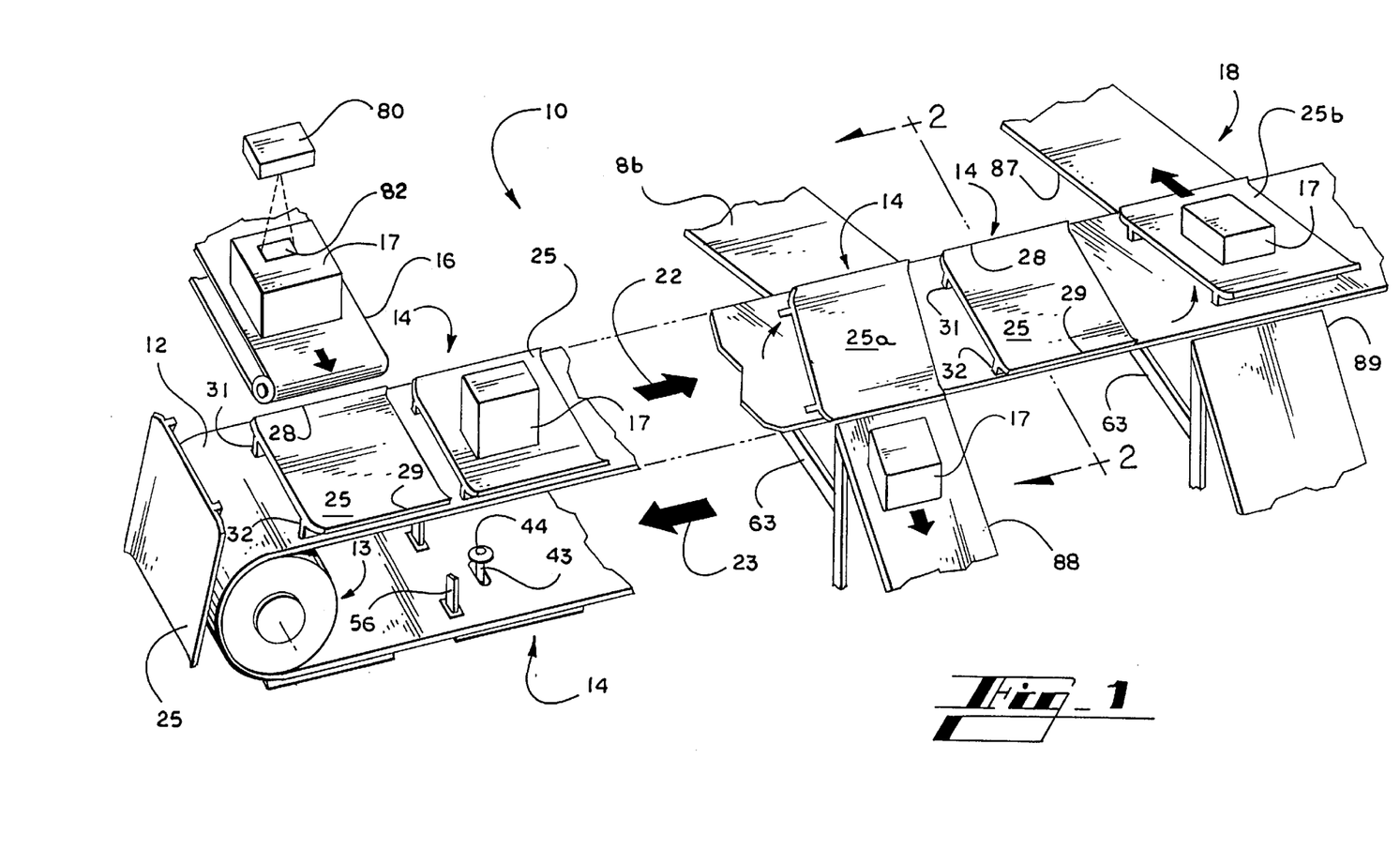
FIG. 1 shows a partial pictorial view of a tilt tray sorting system embodying the present invention.

Referring now to the drawings, in which like numerals refer to like parts throughout the several views, FIG. 1 shows a sorting system 10 embodying the present invention. In summary, the sorting system 10 is a tilt tray sorter including a continuous belt conveyor 12 driven by a drive drum 13, and carrying a plurality of tilt tray assemblies 14. A feed conveyor 16 delivers packages 17 to the tray assemblies 14, which hold the packages until the conveyor 12 moves to an output section 18 where a plurality of trip mechanisms 20, shown in FIGS. 2–5, discharge the packages at appropriate output locations, as described in detail below. Feeding and discharge of packages may be automated as described below in connection with FIG. 11.

The conveyor belt 12 is a continuous belt, and thus passes along an upper flight, during which packages are carried by the tilt tray assemblies 14, and then back along a lower flight. The direction of the upper flight is shown by the arrow 22 in FIG. 1, and the direction of the lower flight is shown by the arrow 23. The belt may be supported by a slider bed 79, shown in FIG. 2.

Figures 9, 10:
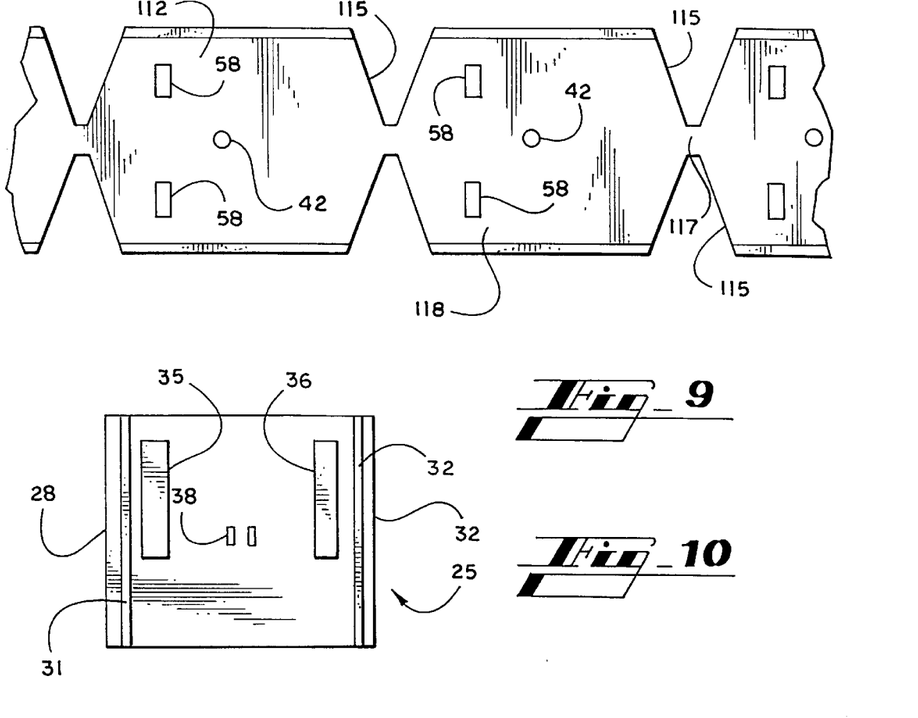
FIG. 9 is a top view of an alternative conveyor belt having linked sections for allowing the belt to go around curves in a horizontal orientation.
FIG. 10 is a bottom view of a tray used in the system of FIG. 1.

The tilt tray assemblies 14 each include a tray 25, which defines a platform 27 with left and right upturned side edges 28 and 29, respectively. The upturned edges extend parallel to the side of the conveyor belt 12, and help to prevent the packages from slipping off the tray 25 during movement of the belt 12. Under the tray 25, left and right elongate feet 31 and 32 project downwardly from the platform 27, parallel to and spaced a short distance inwardly from the side edges 28 and 29. The feet 31 and 32 provide contact locations with the belt 12 and define tilt axes about which the tray 25 tilts when packages are discharged. Also on the underside of the platform 27, a plan view of which is shown in FIG. 10, left and right lift grooves 35 and 36 are formed, extending parallel to the elongate feet. These grooves receive elements of a lifting actuator described below. Between the grooves, a bracket or socket 38 is positioned at the center of the platform 27.

Figure 2:
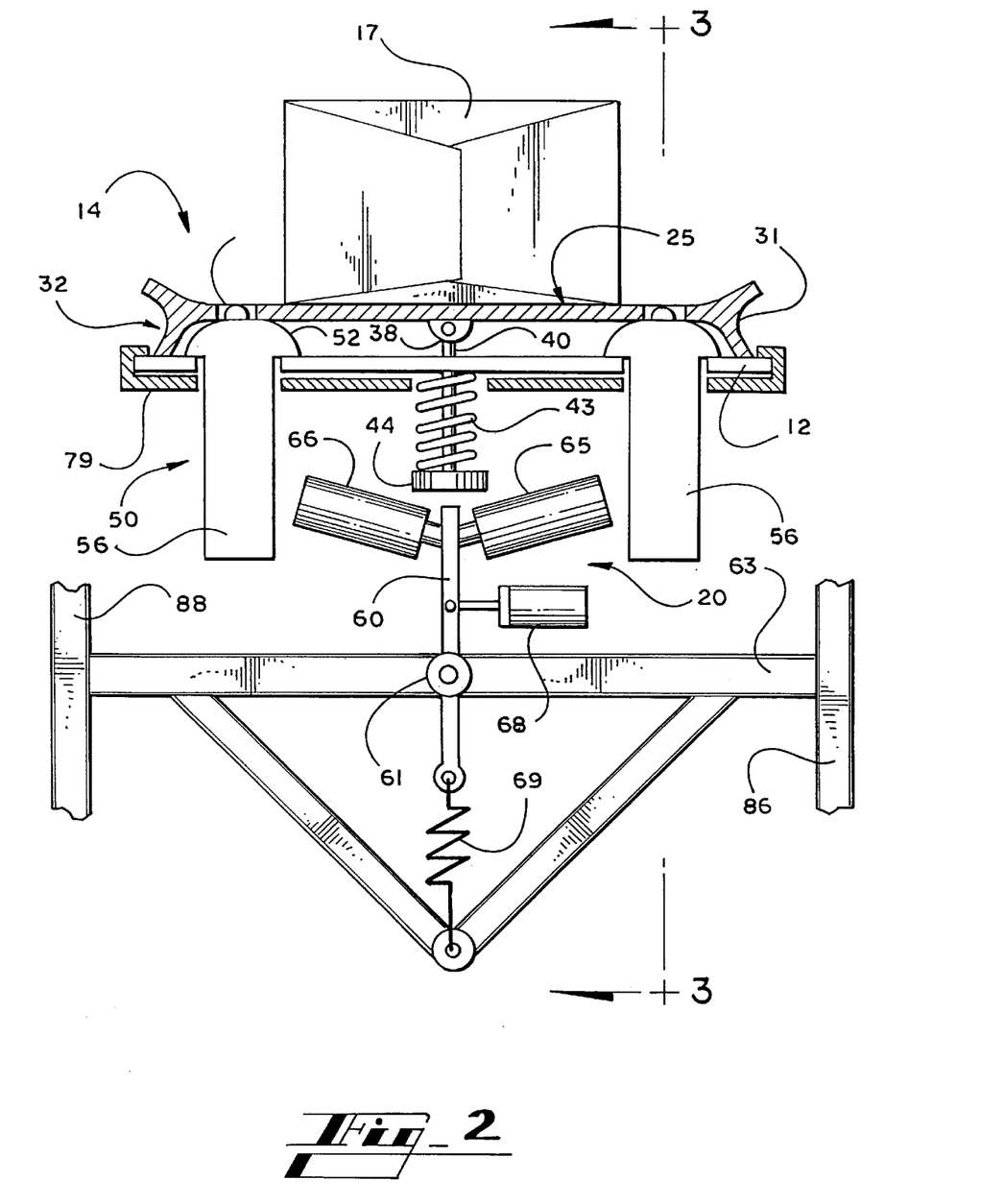
FIG. 2 shows a cross-sectional view taken along line 2—2 of FIG. 1.
Figure 3:
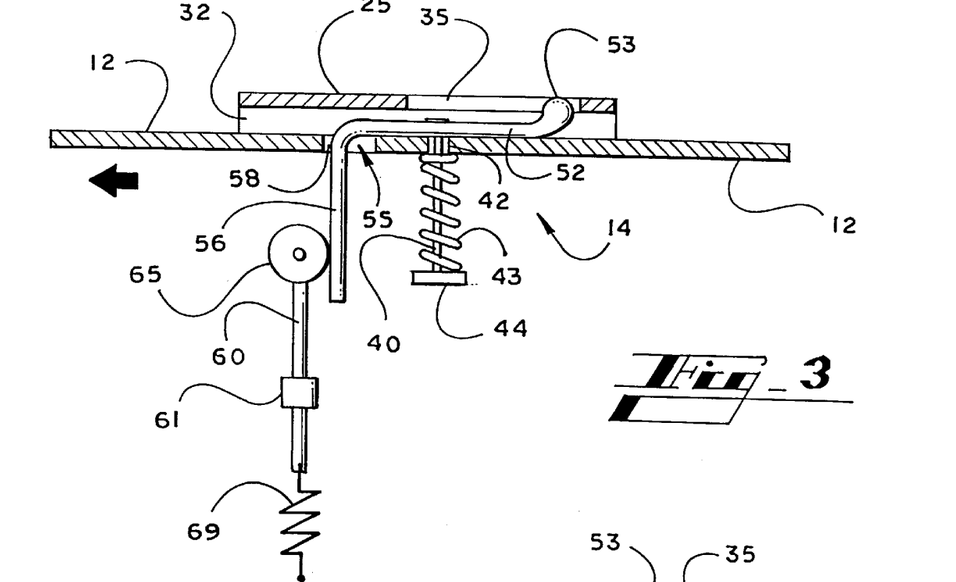
FIG. 3 is a left side cross-sectional view of a tilt tray assembly of FIG. 1 approaching a trip mechanism, taken along line 3—3 of FIG. 2.

A rod 40 defines a ball end that is movably received in the socket 38. The rod 40 extends downwardly from the tray 25 through a retractor opening 42 defined in the belt under each tray, as best shown in FIGS. 2 and 3. A spring 43 is fit over the rod 40 beneath the belt and held on the rod by a retainer 44. Thus, the rod and spring form a resilient link tending to return the tray 25 to a position in which both elongate feet 31 and 32 are engaging the belt 12. The rod and spring also hold the tray on the belt along the return flight of the belt, when the trays are inverted.

Figure 8:
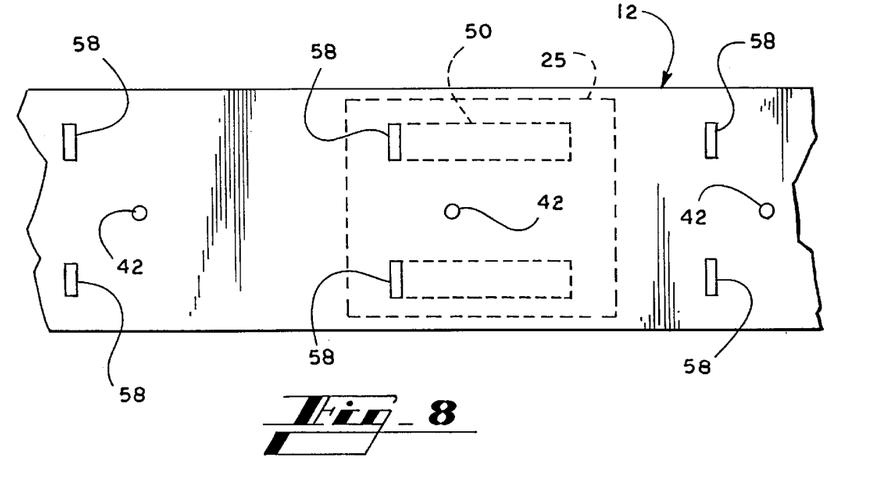
FIG. 8 is a top view of a conveyor belt with openings formed for parts of the tilt tray assemblies.

A pair of actuators 50 also form part of each tilt tray assembly 14. The L-shaped actuators 50 include a lifting arm 52, the tray engaging portion, connected by a bend 55 to a trigger arm 56. When a tray 25 is carrying a package prior to discharge, the lifting arm is positioned horizontally in the recess formed under the tray 25 between the feet 31 and 32, as shown in FIG. 3. A ball-shaped follower 53 is formed at the end of the lifting arm 52 and is received in one of the lift grooves 35 or 36, for the purpose of guiding the lifting arm in a straight path as it rises. The grooves are formed sufficiently wide so that the follower does not bind in the slot as the tray rotates up and toward center of belt. The trigger arm extends downwardly through a slot 58 in the belt 12 to be exposed beneath the belt. The positions of the slots 58 and the retractor opening 42 in the belt are shown in FIG. 8.

The angle of the bend 55 between the lifting arm 52 and the trigger arm 56 should be between about 45° and about 110° to provide sufficient leverage, and preferably is near a right angle.

If a slider bed 79 is utilized, it must define open channels for the trigger arms 56 and the rod 40, as shown in FIG. 2.

Figure 5:
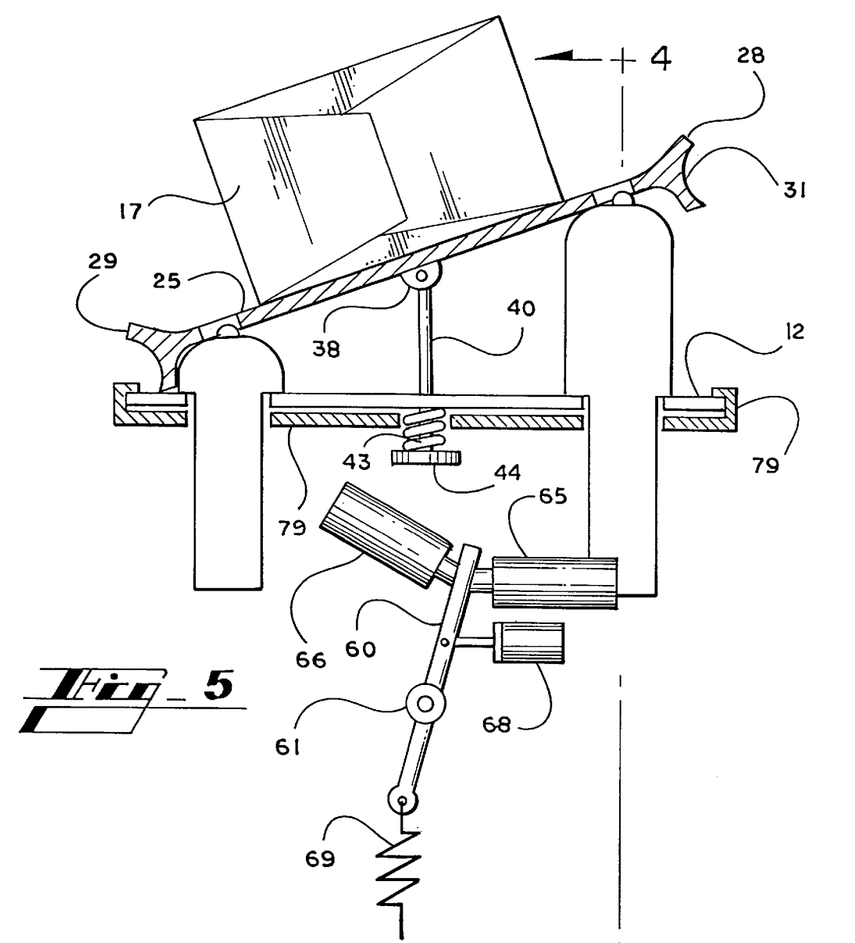
FIG. 5 is an end view of the tilt tray assembly of FIG. 4.
Figure 6:
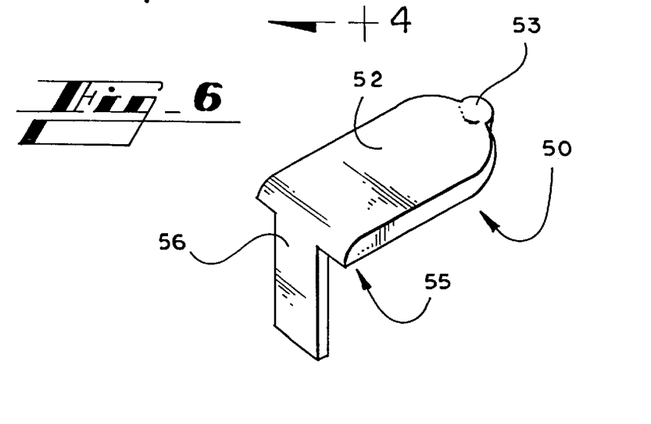
FIG. 6 is a pictorial view of the actuator of FIGS. 2–5.

Each of the trip mechanisms 20, shown in detail in FIGS. 2 and 5, includes an upright shaft 60 mounted on a horizontal pivot 61 attached to a support structure 63 that is connected to structure of the output section 18, as shown in FIG. 1. At the top of the shaft 60, left and right roller assemblies 65 and 66 are attached to form a "Y" configuration with the shaft 60. A three-position solenoid 68 operates a piston rod connected to the shaft 60 between the pivot 61 and the roller assemblies. The solenoid 68 is capable of rotating the trip mechanism between a neutral position in which the shaft 60 is vertical and the roller assemblies lie between the paths of the two actuators 50 of each tilt tray assembly 14, a second position in which the left roller assembly 65 is in the path of the trigger arm 56 associated with the left actuator, and a third position in which the right roller assembly 66 is in the path of the trigger arm 56 associated with the right actuator. A return spring 69 is connected between the lower end of the shaft 60 and the structure 63 to help urge the shaft 60 to its neutral position when the solenoid is deenergized. All of the parts of the trip mechanisms 20 are suspended between the upper and lower flights of the continuous conveyor belt 12 so as not to interfere with the parts of the passing tilt tray assemblies that extend through the belt.

The output section 18 includes a number of output chutes, the number depending on the number of output destinations to which the packages entering from the feed belt 16 need to be routed. In FIG. 1, by way of example, two left output chutes 86 and 87, and two right output chutes 88 and 89, are shown. One trip mechanism 20 serves a pair of output chutes, such as left chute 86 and right chute 88, that are the same distance from the feed belt 16. The support structure 63, which suspends the trip mechanism 20 between the flights of the belt 12, extends between the left and right output chutes, as shown in FIGS. 1 and 2.

Various output receptacles could be used in lieu of the chutes 86–89, such as conveyors, bags, or other containers.

Figure 7:
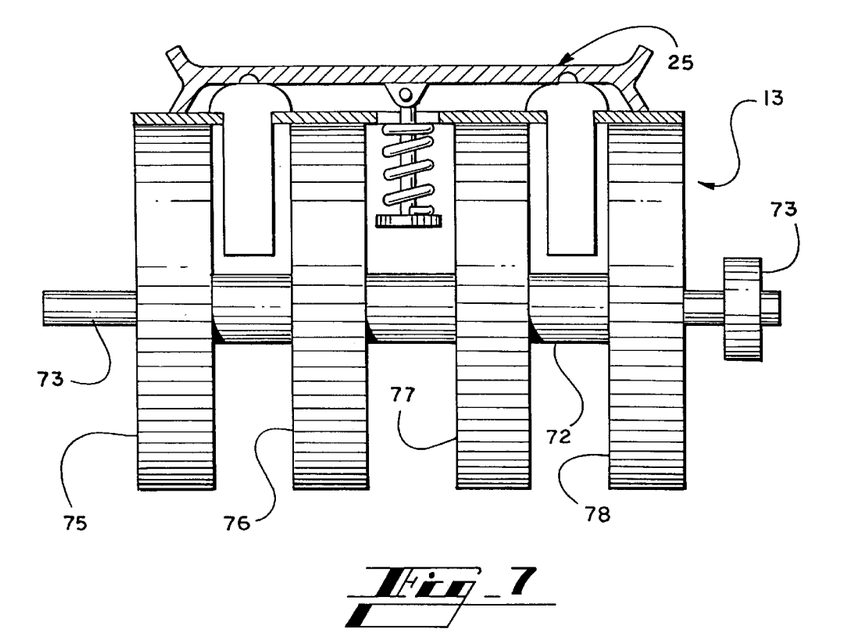
FIG. 7 is an end view of the drum drive of the system of FIG. 1.

The belt 12 is driven by the drive drum 13, shown in FIGS. 1 and 7. The drum 13 is mounted on a drive shaft 72, which is turned by a drive pulley 73. The pulley is operated by a drive belt and motor (not shown). The drum 13 is segmented into four drum discs 75, 76, 77 and 78, creating a series of annular spaces between the discs. These spaces are set up to allow the trigger arms 56 and the rods 40 and retainers 44 to pass through the spaces as described below.

In an alternate embodiment shown in FIG. 9, a belt 112 is substituted for the belt 12. The belt 112 defines cutouts 115 extending from both side edges of the belt toward its center, and defining belt sections 118 for each tilt tray assembly 14. The opposing cutouts 115 stop a short distance from the centerline of the belt 112 to define a central web connection 117 that joins adjacent belt sections 118. Preferably, the belt material is specially reinforced through the web connection 117. This construction allows the belt 112 to turn corners without special overlapping belt sections. The cutouts 115 allow the adjacent sections 118 to bend about the web connection 117 to change direction or round a curve. In other respects, this embodiment operates in the same manner as the first embodiment previously described.

OPERATION

Figure 11:
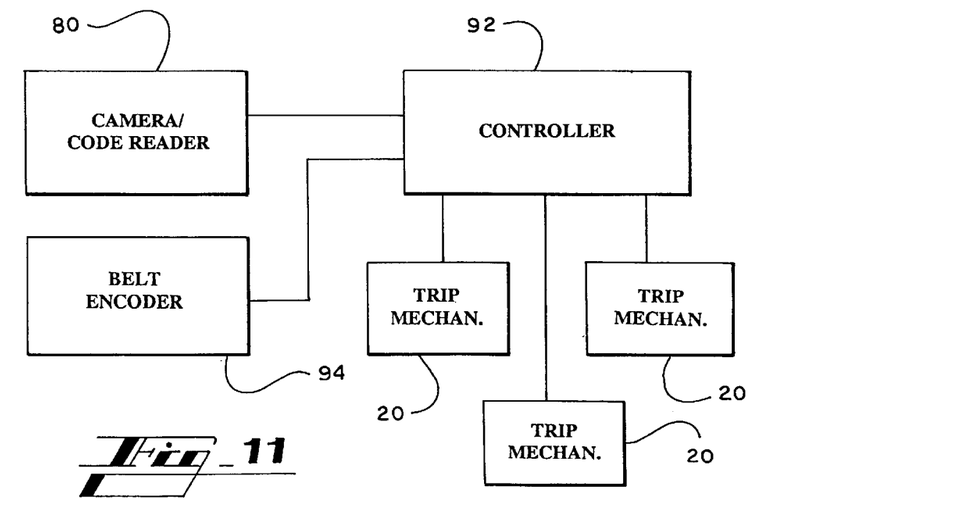
FIG. 11 is a block diagram of a control system for the tilt tray sorter of FIG. 1.

The sorting process is controlled by a digital controller 92. The controller may be a programmed general purpose personal computer or a programmable logic controller (PLC). The controller receives input from a rotary belt encoder 94 of a type well known in the art associated with the belt 12, and from the camera 80 or an alternative label reader or manual input device. The camera 80 or other input device is used to acquire destination data about each package as the package is placed onto the sorting system. Any bar codes or other symbols on a label 82 on the package are detected and decoded. Destination information may be embedded in a dense code, or may be stored in a database location the address of which is contained in a bar code. Furthermore, textual address information on the label can be analyzed using OCR techniques. When a package is imaged at the reader 80, the current count of the encoder 94 is obtained. The rotary encoder device 94 allows the controller to track how far the belt 12 has traveled since any particular package was input onto the system from the feed belt 16.

A suitable system for imaging labels is shown in U.S. Pat. Nos. 5,291,564; 5,308,960; 5,327,171; and 5,430,282 which are incorporated herein by reference. Systems for locating and decoding bar codes and the MaxiCode dense code symbology are described in U.S. Pat. Nos. 4,874,936; 4,896, 029; 5,438,188; 5,412,196; 5,412,197; 5,343,028; 5,352, 878; 5,404,003; 5,384,451 and PCT Publication No. WO 95/34043, respectively, all of which are incorporated herein by reference.

A record for each package stored in the controller memory may contain the package identification, destination address, and package characteristics. A description of the contents of the package, its dimensions and weight, or a code indicating the contents are fragile or hazardous or have some other special status, may be stored.

It should be understood that the present invention can utilize feed mechanisms other that the feed belt shown, or the packages can be placed manually onto the trays 25.

In a known manner, the controller determines when a package should be discharged. At such times, the controller provides control signals instructing the trip mechanisms 20 when to operate to tilt the trays 25 to transfer packages off the conveyor, and which direction to tilt. A system for timing the discharge of packages from a tilt tray sorter is described in U.S. Pat. No. 5,433,311 to Bonnet, which is incorporated herein by reference.

Once the destination information for the package is known, the controller 92 looks up in an appropriate part of its memory the proper output chute corresponding to the package's destination, and the number of encoder counts between the feeder belt 16 and a location between the destination output chute and the preceding output chute's trip mechanism. The count that the encoder will send to the controller when this location is reached, referred to as a discharge count, is calculated by the controller. Preferably, this information is stored in fields of the record already created for the package.

The controller reads the encoder count as the conveyor 12 travels, and compares the encoder count to the list of discharge counts stored in memory. When the controller receives a discharge count, it reads the associated destination chute identification, and sends a signal to the corresponding trip mechanism solenoid 68, to cause the appropriate roller assembly 65 or 66 to move into position to engage the trigger arm 56 of either the left or right actuator 50, as shown in FIG. 3.

Figure 4:
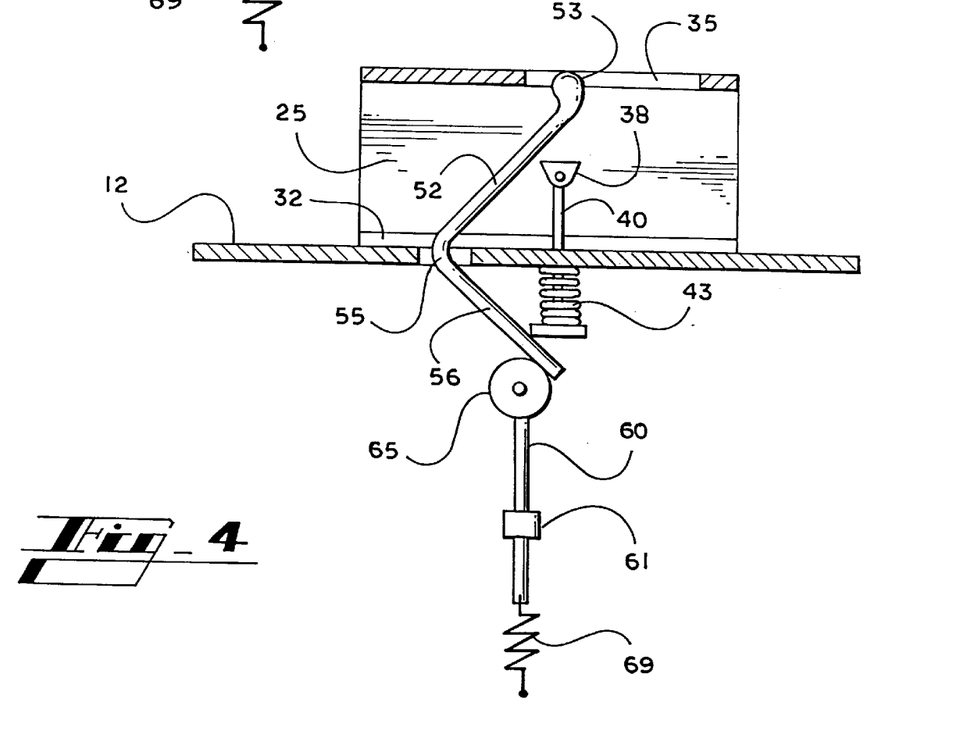
FIG. 4 is a left side cross-sectional view of the tilt tray assembly of FIG. 3, showing the actuator moved by the trip mechanism to tilt the tray, taken along line 4—4 of FIG. 5.

As the belt 12 passes the activated trip mechanism, the roller assembly pushes the trigger arm 56, causing the actuator 50 to pivot about the bend 55 where it passes through the slot 58 in the belt. This in turn causes the lifting arm 52 to swing upward, tilting the tray 25 against the force of the spring 43, as shown in FIG. 4. As the lifting arm rises, the follower 53 travels along the lift groove 35 or 36. Referring to FIG. 1, the tray 25*a* has been tilted about its right foot 32 by the left actuator in response to moving the left roller assembly 65 into the path of the actuator. This discharges the package into a chute 88 on the right side of the belt 12. In the case of the tray 25*b,* the trip mechanism has moved the roller assembly 66 into the path of the right actuator to tilt the tray about its foot 31 to discharge a package into a chute 87 on the left side of the belt 12.

Once the roller assembly passes the trigger arm, the actuator 50 falls back into its original position and the tray 25 falls back onto the belt 12 under the influence of the spring 43 and gravity. After the belt has travelled an additional number of encoder counts sufficient to allow the actuator 50 to completely clear the trip mechanism, the controller sends a reset signal to the trip mechanism solenoid 68 to return to the shaft 60 to the vertical or neutral position.

After passing all the discharge chutes, the tilt tray assemblies 14 pass around an idler drum (not shown) that has multiple discs similar in contruction to the drive drum 13. Then the trays return to the drive drum end of the sorter 10 hanging from the belt 12 by the spring 43 and retainer 44. As they approach the drive drum 13, the trigger arms 56 and rods 40 protruding up through the lower flight of the belt 12 enter the spaces between the discs 75–78 of the drive drum. The slots 58 in the belt 12 are made large enough so that the trigger arms do not bind while moving within the slots 58 as the tray 25 passes around the drive drum 13. Once they have rounded the drum 13, the trays 25 are ready to receive a package from the feed belt 16.

Those skilled in the art will understand that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory. A programmable logic controller (PLC) may be appropriate.

It should be understood that the trip mechanisms could be replaced by mechanisms (for example solenoids) travelling with the belt in association with each trigger arm of each tilt tray assembly 14. Such mechanisms would be connected to swing the trigger arm 56 when the controller 92 sends a signal to tilt the tray.

From the foregoing it will be understood that the present invention provides a tilt tray sorting system with a high speed, reliable, mechanical actuator for tilting the trays, suitable for tilting trays carried on a belt conveyor. The invention also provides a conveyor belt system for transporting the trays and actuator mechanism continuously between a package feed station and a number of output locations to which the packages may be sorted.

While this invention has been described in detail with particular reference to a preferred embodiment thereof, it will be understood that modifications and variations may be made without departing from the scope of the invention as defined in the appended claims.

What is claimed is:

1. A tilt tray sorting system, comprising:
   a plurality of tilt tray assemblies mounted on a belt conveyor, each of said assemblies comprising:
   a tray;
   an actuator, comprising a tray-engaging portion and a trigger arm extending from said tray; and
   a moveable trip member selectively positionable in the path of said trigger arm, such that when said trip member strikes said trigger arm, said actuator moves to tilt said tray about said axis.

2. A tilt tray sorting system, comprising:
   a plurality of tilt tray assemblies mounted on a belt conveyor, each of said assemblies comprising:
   a tray engaging said belt along a pivot axis generally parallel to a path of travel of said belt;
   an actuator, comprising a tray-engaging portion and a trigger arm extending from said tray; and
   a moveable trip member selectively positionable in the path of said trigger arm, such that when said trip member strikes said trigger arm, said actuator moves to tilt said tray about said axis.

3. A tilt tray sorting system, comprising:
   a plurality of tilt tray assemblies mounted on a belt conveyor, each of said assemblies comprising:
   a tray mounted for tilting about an axis generally parallel to a path of travel of said belt; and
   an actuator, comprising a tray-engaging portion and a trigger arm extending through an opening in said belt to a position below said belt; and
   a moveable trip member selectively positionable in the path of said trigger arm, such that when said trip member strikes said trigger arm, said actuator moves to tilt said tray about said axis.

4. The apparatus of claim 3, wherein said actuator comprises a pivot point between said tray-engaging portion and said trigger arm; and
   wherein when said trip member strikes said trigger arm, said actuator pivots about said pivot point and said tray-engaging portion tilts said tray about said axis.

5. The apparatus of claim 3, wherein each of said trays is tiltable about a pair of spaced apart axes generally parallel to said path of travel, and wherein each of said tray assemblies comprises a pair of said actuators, each positioned for tilting said tray about one of said axes.

6. The apparatus of claim 5, wherein said trip member is selectively positionable in the path of one or the other of said actuators.

7. The apparatus of claim 3, wherein:
   each of said trays comprises at least one left contact location defining a left tilt axis along which said tray engages said belt on one side of a centerline of said belt, said left tilt axis being generally parallel to said path of travel, and at least one right contact location defining a right tilt axis along which said tray engages said belt on the other side of a centerline of said belt, said right tilt axis being generally parallel to said path of travel; and
   each of said tray assemblies comprises a pair of said actuators, each positioned for tilting said tray about one of said left and right tilt axes.

8. The apparatus of claim 7, further comprising a controller for selectively positioning said trip member in the path of either of the trigger arms of said pair of actuators, such that said tray may be tilted toward either side of said belt.

9. The apparatus of claim 8, further comprising a resilient link connecting said tray to said belt so as to return said tray to a position with said left and right contact locations engaging said belt after said tray is tilted by one of said actuators.

10. The apparatus of claim 9, wherein each of said pair of actuators comprises an L-shaped member comprising a lifting arm lying between said belt and said tray, said trigger arm extending from said lifting arm through said opening in said belt; and
    wherein when said trip member is located under said belt, so as to selectively strike said trigger arm and cause said actuator to pivot about said opening in said belt, such that said lifting arm rotates outwardly away from said belt and lifts one side of said tray, causing said tray to pivot about the opposite tilt axis.

11. The apparatus of claim 10, wherein said contact locations comprise feet depending from a central portion of said tray so as to create a recess for said lifting arms between said central portion and said belt.

12. The apparatus of claim 11, further comprising a pair of grooves formed in an inner surface of said central portion of said tray, and a follower formed on an end of each of said lifting arms, shaped to be received in said groove.

13. The apparatus of claim 12, wherein said trip member comprises a trip arm pivotally mounted about a trip pivot point, and a solenoid connected to said trip arm, said solenoid being responsive to said controller to pivot said trip arm into the path of either one of said trigger arms.

14. The apparatus of claim 13, wherein said trip end comprises a Y-shaped member and a roller mounted on each branch of said Y-shaped member, one of said rollers being positioned in the path of a trigger arm when said trip member is operated.

15. A tilt tray sorting system, comprising:

a conveyor belt;

at least one tray spanning a centerline of said belt, said tray defining at least one left foot defining a left tilt axis, and at least one right foot defining a right tilt axis spaced across said centerline from said left tilt axis, said feet elevating a central portion of said tray above said belt;

an L-shaped left actuator comprising a left lifting arm lying between said belt and said tray adjacent to said left foot, and joined to a left trigger arm extending down through a left opening in said belt;

an L-shaped right actuator comprising a right lifting arm lying between said belt and said tray adjacent to said right foot, and joined to a right trigger arm extending down through a right opening in said belt;

a link attached to said tray approximately along said centerline of said belt, and extending down through a retractor opening in said belt;

a spring retained between a lower end of said link and said belt, said spring operative to urge said tray into a position wherein both said left and right feet are engaging said belt; and means for selectively moving a trip member into the path of said left trigger arm or said right trigger arm.

16. The apparatus of claim 15, wherein said trip member comprises a Y-shaped trip arm pivotally mounted about a pivot point generally parallel to and beneath said centerline of said belt, each branch of said Y carrying a roller; and wherein said means for selectively moving said trip member comprises a three-position solenoid operative to swing said trip arm to move one of said rollers into the path of said left trigger arm, or alternatively to move the other of said rollers into the path of said right trigger arm.

17. The apparatus of claim 16, wherein said belt comprises an endless belt passing around a pair of end drums each including annular channels therein for allowing unobstructed passage of said trigger arms and said link around said drums.

* * * * *